United States Patent Office 3,644,558
Patented Feb. 22, 1972

3,644,558
PROCESS FOR ISOMERIZING OLEFINS
Günther Wilke and Borislav Bogdanović, Mulheim (Ruhr), Germany, assignors to Studiengesellschaft Kohle m.b.H., Mulheim (Ruhr), Germany
No Drawing. Filed Oct. 20, 1969, Ser. No. 867,928
Claims priority, application Germany, May 14, 1969,
P 19 24 628.7
Int. Cl. C07c 5/22, 5/24
U.S. Cl. 260—683.2                    10 Claims

ABSTRACT OF THE DISCLOSURE

Process for isomerizing olefins by subjecting an isomeric mixture of at least one olefin to contact at low temperatures for an extended period of time with an $\pi$-allyl nickel compound, a Lewis acid and a phosphine.

---

The present invention relates to a process for isomerizing olefins.

It is known that mono-olefins and diolefins can be oligomerized or polymerized as described in German patent application P 15 20 964.0. Highly effective catalysts for this oligomerization, are for example, transition metal complex compounds of the $\pi$-allyl-M-X, in which M represents a transition metal of the Groups III to VIII of the Periodic Table, preferably sub-group transition metals ("b" metals) and X is an anionic radical. The $\pi$-allyl ligand can have substituted thereon alkyl, cycloalkyl, aralkyl or aryl groups.

It is known that in this process the activity of the catalysts can be increased several times if the $\pi$-allyl-M complex compounds have as constituents thereof or in combination therewith Lewis acids, e.g. compounds such as $R_2AlX$, $RAlX_2$ or $AlX_3$, in which X can be Cl, Br, or I and R can be an alkyl, cycloalkyl, aralkyl or an aryl group.

In this process it is known that the selectivity of the catalysts can be altered by adding compounds which are able to act as electron donors, i.e. Lewis bases. Such electron donors are, for example, alkyl, cycloalkyl, aralkyl or aryl compounds of the elements of the Group Va of the Periodic Table, e.g., trialkyl, cycloalkyl, aralkyl or aryl esters of the Group Va elements, as well as their triamides. In addition aliphatic, cyclic and aromatic ethers and thio-ethers, and dialkyl sulphoxides are useful electron donors.

The linking of two propylene units when propylene is dimerized occurs in various ways depending on the catalyst used particularly depending on which Lewis base is used. Thus, for example triphenylphosphines tend to give high yields of 2-methyl pentenes, while the more basic tricyclohexyl phosphine favors the formation of high yields of 2,3-dimethylbutenes. The proportion of n-hexenes produced decreases with increased 2,3-dimethylbutene isomer production.

It is an object of this invention to provide a process for isomerizing olefins.

It is a further object of this invention to dimerize olefins in the presence of particular catalysts which direct the reaction toward particular isomeric products.

Other and additional objects of this invention will become apparent from a consideration of this entire specification including the claims thereof.

In accord with and fulfilling these objects, one aspect of this invention resides in isomerizing olefins, such as propylene dimers, by treating such with an $\pi$-allyl nickel-Lewis acid-Lewis base complex.

It has now surprisingly been found that the previously described dimerization catalysts are in addition more or less strong catalysts for olefin isomerization. Thus, the initially formed products of an olefin dimerization, particularly propylene dimers, subsequently change into thermodynamically more stable isomeric products, in the absence of propylene where the residence times used are longer than those needed for the dimerization reaction itself. In the case of, for example, 2,3-dimethylbutene, the thermodynamic equilibrium at 0° is about 95% of 2,3-dimethyl-2-butene, while in the case of 2-methyl-pentene, it is about 84% of 2-methyl-2-pentene. In the usual dimerization reaction, under conventional conditions and reaction parameters, both of these particular isomeric products are obtained only in very low yields of about a few percent or even only in traces.

The isomerizing directing activity of these catalysts is highly dependent on the nature of the particular phosphine moiety of the catalyst. In general, those phosphines which give high yields of 2,3-dimethylbutenes in the dimerization of propylene, i.e. strongly basic phosphines, such as tricyclohexyl phosphine are less active in the isomerization than phosphines which yield a small quantity of 2,3-dimethylbutenes in the dimerization of propylene, i.e. phosphines of lower basicity, such as triphenylphosphine. Catalyst containing phosphines of low basicity are thus good for the isomerization of olefins. Particularly good isomerization catalysts in this sense are those containing trimethylphosphine.

An advantage of using such isomerization catalysts in that substantially no undesirable side reactions, such as oligomerization or polymerization reactions occur during the isomerization.

Another advantage of these catalysts is that the thermodynamic equilibria between the isomeric olefins can be adjusted at comparatively low temperatures, at which temperatures the equilibria are displaced in favor of the products which are thermodynamically more stable.

Finally the use of the phosphine-containing isomerization catalysts according to this invention for the isomerization of mixtures of propylene dimers is advantageous because all of the $C_6$ olefin fractions are isomerized. This is not the case when conventional isomerization catalysts, such as p-toluene-sulphonic acid or potassium tert.-butylate, are used.

Accordingly, the invention provides a process for the isomerization of olefins in which branched and unbranched, open-chain olefins or their mixtures are treated with $\pi$-allyl-nickel-Lewis acid Lewis bases complex compound catalyst mixtures.

The isomer mixture of straight-chain and branched-chain hexenes which is formed when propylene is dimerized using the previously described catalysts is very difficult to resolve by distillation. However, it is desirable to be able to produce technically useful quantities of specific olefins, such as methylpentenes or 2,3-dimethylbutenes, in pure form. High yields of 2,3-dimethylbutenes are obtained using catalysts containing strongly basic phosphines, such as triisopropylphosphine or tricyclohexylphosphine, while high yields of 2-methylpentenes are obtained with phosphines which contain, for example, sterically hindering tertiary butyl groups, e.g. isopropyl di-tertiarbutylphosphine. Neither of these phosphines are suitable for isomerizing the product to give final thermodynamically products. However, if, for example the isomer mixture from the dimerization of propylene, which has been produced with a catalyst as described, containing $\pi$-allyl-nickel-halide, ethylaluminiumdichloride and tricyclohexyl-phosphine, is subsequently treated with a similar catalyst, in which the tricyclohexylphosphine has been replaced by trimethylphosphine, a mixture is obtained (in a yield of more than 90%), which consists of the thermodynamically stable 2,3-dimethyl-2-butene and 2-methyl-2-pentene which can then be separated by distillation.

By using the two separate stages of (1) dimerization of propylene and (2) isomerization of the produced dimer, it is now possible for the first time to prepare the 2,3-dimethylbutene structure in an inexpensive manner and on a commercial scale. Furthermore, 2-methyl-2-pentene which is most useful for the synthesis of isoprene is also formed in commercial quantities on an adequate scale.

It is practical to carry out this isomerization process at about −80° to +50° C., preferably about −30° to +30° C. It has been found to be sufficient to permit isomerization to be effected for reaction times of about 1 to 100 hours, preferably 10 to 20 hours, over and above the dimerization reaction time. The mole ratio of phosphine to $\tau$-allyl nickel compound should be about 1:1 to 2:1, preferably about 1:1 to 1.5:1. The mole ratio of phosphine to total olefin isomers being isomerized should be about 1:100 to 1:10000, preferably about 1:300 to 1:10000.

This isomerization can be carried out, in the case of isomerizing olefin dimerization product, either by separating the olefin dimer from its dimerization reaction mass and then adding isomerization catalyst thereto as shown by this invention or by merely adding the isomerization catalyst, or at least the missing parts thereof, to the dimerization reaction mixture without prior resolution thereof.

The isomerized product may be worked up and resolved by conventional techniques. The synthesis of 2,3-dimethyl-2-butene according to this invention provides a novel access means to 2,3-dimethylbutadiene, which is a known excellent starting material for the production of synthetic rubber. The dehydrogenation of 2,3-dimethylbutene to 2,3-dimethylbutadiene using conventional dehydrogenation catalysts and techniques does not present any difficulties and results in good yield.

Another possible use for 2,3-dimethylbutene or 2,3-dimethylbutadiene is in the preparation of pyromellitic acid or anhydride. 2,3-Dimethylbutadiene is reacted with maleic anhydride and the adduct is oxidized under dehyrating conditions in a known manner.

The propylene dimers are of industrial interest as gasoline additives, since they increase their octane numbers. In particular dimers with a high content of 2,3-dimethylbutenes, or even of 2,3-dimethylbutane are valuable in this use. The improvement is particularly advantageous in the low boiling ranges of gasoline.

The following examples illustrate the invention without limiting such.

EXAMPLE I

Propylene was dimerized by introducing 250–500 g. (6–12 moles) of propylene into a chlorobenzene solution containing 1.0 millimoles of a $\tau$-allyl-nickel catalyst at −20° C. and 1 atm. for 60 minutes.

The following Table I shows the various yields of particular isomers as a function of the particular phosphine used.

TABLE I

| Run | 1 | 2 | 3 | 4 | 5 | 6 | 7 | 8 |
|---|---|---|---|---|---|---|---|---|
| n-Hexenes, percent | 21.6 | 9.9 | 9.2 | 7.1 | 3.3 | 1.8 | 1.6 | 1.0 |
| 2-methylpentenes, percent | 73.9 | 80.3 | 69.7 | 69.6 | 37.9 | 30.3 | 43.1 | 81.5 |
| 2,3-dimethylbutenes, percent | 4.5 | 9.8 | 21.1 | 23.3 | 58.8 | 67.9 | 55.1 | 17.3 |

In the above table, the various runs were carried out with the following listed phosphines in the catalyst.

(1) triphenyl phosphine
(2) trimethyl phosphine
(3) triethyl phosphine
(4) tri-n-butyl phosphine
(5) tri-cyclohexyl phosphine
(6) tri-iso-propyl phosphine
(7) ethyl-di-tert.-butyl phosphine
(8) isopropyl-di-tert.-butyl phosphine Table I shows that the proportion of 2,3-dimethylbutenes increases from 4.5% to 68% when the phosphine is changed through the sequence phenyl, methyl, ethyl, n-butyl and isopropyl. At the same time, the proportions of the n-hexenes produced falls from 21.6% to 1.8% as the phosphine is changed through the same series. In this phosphine series, the phosphines become increasingly more basic.

When using phosphines which contain tert.-butyl groups having a strong steric hinderance action, the proportion of the n-hexenes is reduced still further, but at the same time the proportion of 2,3-dimethylbutenes produced is also reduced, so that the result is a maximum of 2-methylpentenes but at a reduced overall yield.

EXAMPLE II

Isomerization of the $C_6$ olefins produced by the dimerization of propene

A technical propylene dimer composition made according to the prior art was used for the isomerization. This starting material had the following composition:

| | Percent |
|---|---|
| 4-methyl-1-pentene | 6.9 |
| Cis-4-methyl-2-pentene | 5.5 |
| 2,3-dimethyl-1-butene | 63.9 |
| Trans-4-methyl-2-pentene | 4.8 |
| 2-methyl-1-pentene | 11.4 |
| 2-methyl-2-pentene | 2.7 |
| 3-hexene | 0.2 |
| Trans-2-hexene | 1.0 |
| Cis-2-hexene | 1.3 |
| 2,3-dimethyl-2-butene | 1.1 |
| 1-hexene | 0.1 |

The remainder of the composition comprises small amounts of 2-methyl-pentane, 2,3-dimethylbutane and benzene.

Under a protective gas, such as argon, 500 mg. (2.78 mmol) of $\tau C_3H_5NiBr$, and also the molar equivalent quantity of the particular phosphine as set forth below, which is to be used are dissolved in 100 ml. of chlorobenzene, 100 ml. of the starting olefin mixture described above are added, the batch is cooled to 0° C. and the reaction is started, with vigorous stirring by adding 1.2 ml.=1.45 g.=11.4 mmol of $EtAlCl_2$.

After 19 hours, the reaction was stopped by decomposing the catalysts with triethanolamine, gaseous ammonia or aqueous ammonia and the $C_6$ fraction is distilled off at from 53–80° C. through a 70 cm. Vigreux column.

In the following Table II the product is analyzed as a function of the particular phosphine used in each run.

TABLE II

| | Composition after 19 hours reaction time (in percent) | | | | | | | |
|---|---|---|---|---|---|---|---|---|
| Run | 1 | 2 | 3 | 4 | 5 | 6 | 7+ | 8+ |
| 4-methyl-1-pentene | 0.1 | 0.1 | 0.1 | 0.1 | 0.3 | 0.3 | 0.3 | 1.8 |
| Cis-4-methyl-2-pentene | 0.3 | 0.2 | 0.3 | 0.4 | 1.9 | 2.3 | 2.0 | 7.1 |
| 2,3-dimethyl-1-butene | 2.2 | 7.7 | 34.1 | 38.0 | 34.1 | 44.1 | 49.8 | 63.8 |
| Trans-4-methyl-2-pentene | 2.3 | 2.2 | 3.5 | 3.9 | 11.6 | 11.1 | 13.6 | 8.4 |
| 2-methyl-1-pentene | 0.6 | 1.6 | 2.1 | 2.4 | 0.9 | 2.1 | 4.0 | 10.1 |
| Cis-trans-3-hexene | 0.6 | 0.6 | 0.6 | 0.8 | 0.6 | 0.7 | 0.3 | |
| 2-methyl-2-pentene | 28.6 | 29.3 | 27.8 | 26.5 | 19.1 | 16.9 | 11.6 | 3.6 |
| Trans-2-hexene | 1. | 1. | 1. | 1. | 1.8 | 1. | 2.0 | 1.3 |
| 2,3-dimethyl-2-butene | 63.5 | 57.3 | 30.2 | 27.2 | 30.0 | 20.7 | 15.1 | 2.2 |

In the above table, the following runs used the following phosphines (1) trimethyl phosphine
(2) triphenyl phosphine
(3) triethyl phosphine
(4) tri-n-butyl phosphine
(5) tri-cyclo-hexyl phosphine
(6) tri-iso-propyl phosphine
(7) 1,2-bis-(diphenyl phosphinyl)ethane
(8) 1,2-bis-(diphenyl phosphinyl)ethylene Runs 7 and 8 were carried out with one-third the catalyst concentration and at triple the reaction time of the other runs.

EXAMPLE III

To a solution of 0.459 g. (1.0 millimole) $\tau$-allylnickel-bromidetricyclohexylphosphine ($\tau$-$C_3H_5$NiBr·P($C_6H_{11}$)$_3$) in 100 ml. chlorobenzene, there was aded at —20° C., 0.5 ml. (4.8 millimoles) $C_2H_5AlCl_2$. Propylene of 1 atm. was introduced in this solution for 10 minutes at —10 to —18° C. while stirring vigorously. After working up the reaction product in known manner, a mixture $C_6$ olefins of the following composition was obtained: 1.1% n-hexene, 19.8% 2-methylpentene, 79.4% 2,3-dimethylbutene.

This experiment was repeated but 0.280 g. (1.07 millimoles) of triphenylphosphine, dissolved in 5 ml. of chlorobenzene were added to the reaction mixture before working up and then stirred for 140 hours at 20° to 25° C. Samples were taken at certain time intervals during the 140 hours isomerization. The composition of the reaction products at these intervals has been determined by analysis and is set forth below in Table IV.

TABLE IV

|  | Hours | | | | |
|---|---|---|---|---|---|
|  | 2 | 6 | 18 | 66 | 138 |
| $C_9$-olefin plus higher oligomers, grams | 12.5 | 13 | 14 | 15 | 14 |
| $C_6$-olefins, grams | 34 | 32 | 31.5 | 34.5 | 32.5 |
| 4-methylpentene-(1), percent | 0.3 | 0.1 | 0.1 | 0.1 | 0.1 |
| 4-methylpentene-(2)-cis, percent | 0.9 | 0.7 | 0.5 | 0.3 | 0.3 |
| 2,3-dimethylbutene-(1), percent | 72.5 | 65.6 | 55.3 | 37.8 | 32.0 |
| 4-methylpentene-(2)-, percent trans | 6.2 | 5.2 | 3.9 | 2.6 | 2.3 |
| 2-methylpentene-(1) | 5.0 | 3.2 | 2.1 | 1.7 | 1.7 |
| Hexene-3-(trans plus cis) | 0.3 | 0.3 | 0.3 | 0.3 | 0.5 |
| 2-methylpentene-(2) | 7.4 | 10.6 | 13.4 | 15.3 | 15.5 |
| Hexene-2-(trans) | 0.5 | 0.5 | 0.5 | 0.3 | 0.3 |
| Hexene-2-(cis) | 0.3 | 0.2 | 0.2 | 0.2 | 0.2 |
| 2,3-dimethylbutene-(2) | 6.9 | 13.5 | 23.8 | 41.4 | 46.6 |

The total yield was 70.5 g. $C_9$-olefins+higher oligomers and 164.5 g. $C_6$-olefins.

What is claimed is:

1. A process for the isomerization of olefins which comprises contacting an open chain olefin at —80 to +50° C. for 1 to 100 hours with an isomerization catalyst consisting essentially of a $\tau$-allyl nickel compound, a Lewis acid and a phosphine wherein the mole ratio of phosphine to olefin is 1:100 to 1:10,000.

2. A process as claimed in claim 1 carried out at — to +30° C. for 10 to 20 hours at a phosphine to ol( mole ratio of 1:300 to 1:1000.

3. A process as claimed in claim 1 wherein said ol( is a propylene dimer.

4. A process as claimed in claim 3 wherein said ph phine is at least one member selected from the gr( consisting of trimethyl, triethyl, triphenyl, tricyclohe) tri-n-butyl, tri-tert.-butyl, tri-isopropyl, di-tert.-butyl, i propyl phosphine, 1,2-bis-(diphenyl phosphenyl)-etha and 1,2-bis(diphenylphosphinyl)-ethylene.

5. A process as claimed in claim 1 wherein said Le acid is an alkyl aluminium halide or an aluminium halide.

6. A process as claimed in claim 3 wherein said ison is a mixture of 2,3-dimethyl butenes, 2-methylpent( and n-hexenes.

7. A process as claimed in claim 1 including the p liminary step of dimerizing propylene in the presence a $\tau$-allyl nickel catalyst and then adding said phosph to the dimerization reaction product.

8. A process as claimed in claim 7 wherein orga matter other than said propylene dimer is removed fr said dimerization reaction product prior to the addit of phosphine thereto.

9. A process as claimed in claim 1 wherein said $\tau$-a group has at least one hydrocarbon substituent there 10. A process as claimed in claim 1, wherein s olefin is a mixture of isomeric propylene dimers a wherein the phosphine is trimethyl phosphine, and whe in the product is substantially 2-methyl-2-pentene a 2,3-dimethyl-2-butene.

References Cited

UNITED STATES PATENTS

| 3,471,581 | 10/1969 | Maxfield | 260—( |
| 3,468,921 | 9/1969 | Wilke | 260—( |
| 3,485,892 | 12/1969 | Griffin et al. | 260—683 |
| 3,489,731 | 1/1970 | Imoto et al. | 260—68 |

DELBERT E. GANTZ, Primary Examiner

V. O'KEEFE, Assistant Examiner

U.S. Cl. X.R.

260—683.15, 666 B, 666 A

UNITED STATES PATENT OFFICE
CERTIFICATE OF CORRECTION

Patent No. 3,644,558               Dated February 22, 1972

Inventor(s)  Gunther Wilke et al

It is certified that error appears in the above-identified patent and that said Letters Patent are hereby corrected as shown below:

Change "$\gamma$" to -- $\pi$ -- at the following locations:

Col. 1, lines 16, 26, 29, 33 and 69;

Col. 2, lines 47 and 65;

Col. 3, lines 14 and 50;

Col. 4, line 38;

Col. 5, lines 4, 6 and 44;

Col. 6, lines 20 and 26.

Col. 3, line 17

"1 : 10000" should be -- 1 : 1000 --, both occurrences.

Signed and sealed this 27th day of March 1973.

(SEAL)
Attest:

EDWARD M. FLETCHER, JR.
Attesting Officer

ROBERT GOTTSCHALK
Commissioner of Patents